United States Patent
Burger

(10) Patent No.: US 7,761,445 B2
(45) Date of Patent: Jul. 20, 2010

(54) AUTOMATED SYSTEM FOR IDENTIFYING AND DROPPING MARGINAL DATABASE INDEXES

(75) Inventor: Louis M. Burger, Escondido, CA (US)

(73) Assignee: Teradata US, Inc., Miamisburg, OH (US)

(*) Notice: Subject to any disclaimer, the term of this patent is extended or adjusted under 35 U.S.C. 154(b) by 378 days.

(21) Appl. No.: 11/639,715

(22) Filed: Dec. 15, 2006

(65) Prior Publication Data
US 2007/0136386 A1    Jun. 14, 2007

(51) Int. Cl.
G06F 17/30    (2006.01)
G06F 7/00    (2006.01)

(52) U.S. Cl. ........................................... 707/715
(58) Field of Classification Search ............... None
See application file for complete search history.

(56) References Cited

U.S. PATENT DOCUMENTS

| | | | | |
|---|---|---|---|---|
| 5,924,088 A * | 7/1999 | Jakobsson et al. | ............ | 707/2 |
| 7,047,231 B2 * | 5/2006 | Grasshoff et al. | ............ | 707/2 |
| 2003/0093408 A1 * | 5/2003 | Brown et al. | ............ | 707/2 |
| 2007/0083500 A1 * | 4/2007 | Zibitsker | ............ | 707/3 |

\* cited by examiner

Primary Examiner—Uyen T. Le
(74) Attorney, Agent, or Firm—Gates & Cooper LLP

(57) ABSTRACT

A method and system for managing indexes used to retrieve data from a database stored on a computer, includes determining whether any marginal indexes exist in the database, and removing one or more of the marginal indexes from the database. An index is considered marginal when: (1) it is an access path for one or more queries but the index's performance is matched or nearly matched by one or more other alternative access paths, and/or (2) its overhead has become a concern. These steps or functions are invoked by one or more statements or instructions that cause the computer to perform a Drop Index Analysis on a specified list of tables in the database for a specified workload. The Drop Index Analysis allows users to specify: (1) how many indexes to consider dropping, and/or (2) how much disk space that dropped indexes should free up.

28 Claims, 3 Drawing Sheets

US 7,761,445 B2

AUTOMATED SYSTEM FOR IDENTIFYING AND DROPPING MARGINAL DATABASE INDEXES

BACKGROUND OF THE INVENTION

1. Field of the Invention

This invention relates in general to database management systems performed by computers, and in particular, to an automated system for identifying and dropping marginal database indexes.

2. Description of Related Art

Relational DataBase Management Systems (RDBMS) using a Structured Query Language (SQL) interface are well known in the art for use in data warehouses. The SQL interface has evolved into a standard language for RDBMS software and has been adopted as such by both the American National Standards Institute (ANSI) and the International Standards Organization (ISO).

In an RDBMS, all data is externally structured into tables. A table in a relational database is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies on its ability to link information from multiple tables or views together to perform complex sets of procedures with a single statement.

The SQL interface allows users to formulate relational operations on the tables. One of the most common SQL queries executed by the RDBMS is the SELECT statement. In the SQL standard, the SELECT statement generally comprises the format: "SELECT <clause> FROM <clause> WHERE <clause> GROUP BY <clause> HAVING <clause> ORDER BY <clause>." The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

Indexes are beneficial to the execution of SQL statements because of their ability to improve query performance. One drawback to indexes is the additional disk space they require and the resources needed to maintain them during SQL updates and bulk load operations. Users must consider these tradeoffs before deciding to initially create a new index.

Over the course of time, the factors involved in this initial decision may change and users may wish to drop one or more existing indexes. Disk space can become scarce and users may wish to drop indexes in an effort to reclaim the space they occupy. Update and load operations may become more frequent over time leading to excessive index maintenance costs. In such cases, users would like to identify the set of existing indexes (if any) that can be dropped without significantly impacting query performance. Essentially, users are always looking for the minimal set of indexes that can deliver the required query performance.

Query performance is often dependent on physical database design, which is an essential step to implementing a high performance data warehouse. During this process, users make choices regarding the physical characteristics of their relational tables and columns. The process of making these choices manually is difficult and mistaken prone for even experienced users. For this reason, vendors often provide tools or "wizards" that examine a user's workload and make index recommendations.

The current focus of such tools is on the creation of new indexes to improve workload performance. Current tools are also capable of identifying unused indexes and recommending their removal. However, one important capability that has been overlooked is the identification and removal of "marginal" indexes whose benefit to query performance is positive but insignificant especially when other factors are considered.

Although a given index may be chosen as an optimal access path, it is not uncommon for alternative access paths to exist that would deliver similar performance. Because the optimization process does not reveal its sub-optimal plans, users may not be aware that a smaller set of defined indexes may be able to deliver similar workload performance with only a minor degradation.

Techniques have been developed for solving this problem. However, all known physical database design processes for indexes concentrate on the selection of new indexes or the removal of completely unused indexes. No known solutions focus on removing marginal indexes or helping users to identify the minimal set of required indexes.

Consequently, there is still a need in the art for additional optimization techniques. The present invention satisfies this need.

SUMMARY OF THE INVENTION

To overcome the limitations in the prior art described above, and to overcome other limitations that will become apparent upon reading and understanding the present specification, the present invention discloses a method and system for managing indexes used to retrieve data from a database stored on a computer.

Generally, this entails determining whether any marginal indexes exist in the database, and removing one or more of the marginal indexes from the database. An index is considered marginal: (1) when it is an access path for one or more queries but the index's performance is matched or nearly matched by one or more other alternative access paths, and/or (2) when its overhead has become a concern.

An Index Wizard tool performs these steps or functions, and is invoked by one or more statements or instructions that cause the computer to perform a Drop Index Analysis on a specified list of tables in the database for a specified workload. Preferably, the Drop Index Analysis allows users to specify: (1) how many indexes to consider dropping, and/or (2) how much disk space that dropped indexes should free up.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses an improved method and system for automatically determining the best set of "marginal" indexes to drop in a relational database management system, where the term "marginal" describes an index: (a) that serves as the best access path for one or more queries but whose performance can be nearly matched by other alternative access paths, and (b) whose disk space or maintenance overhead has become a concern.

Environment

Figure 1:
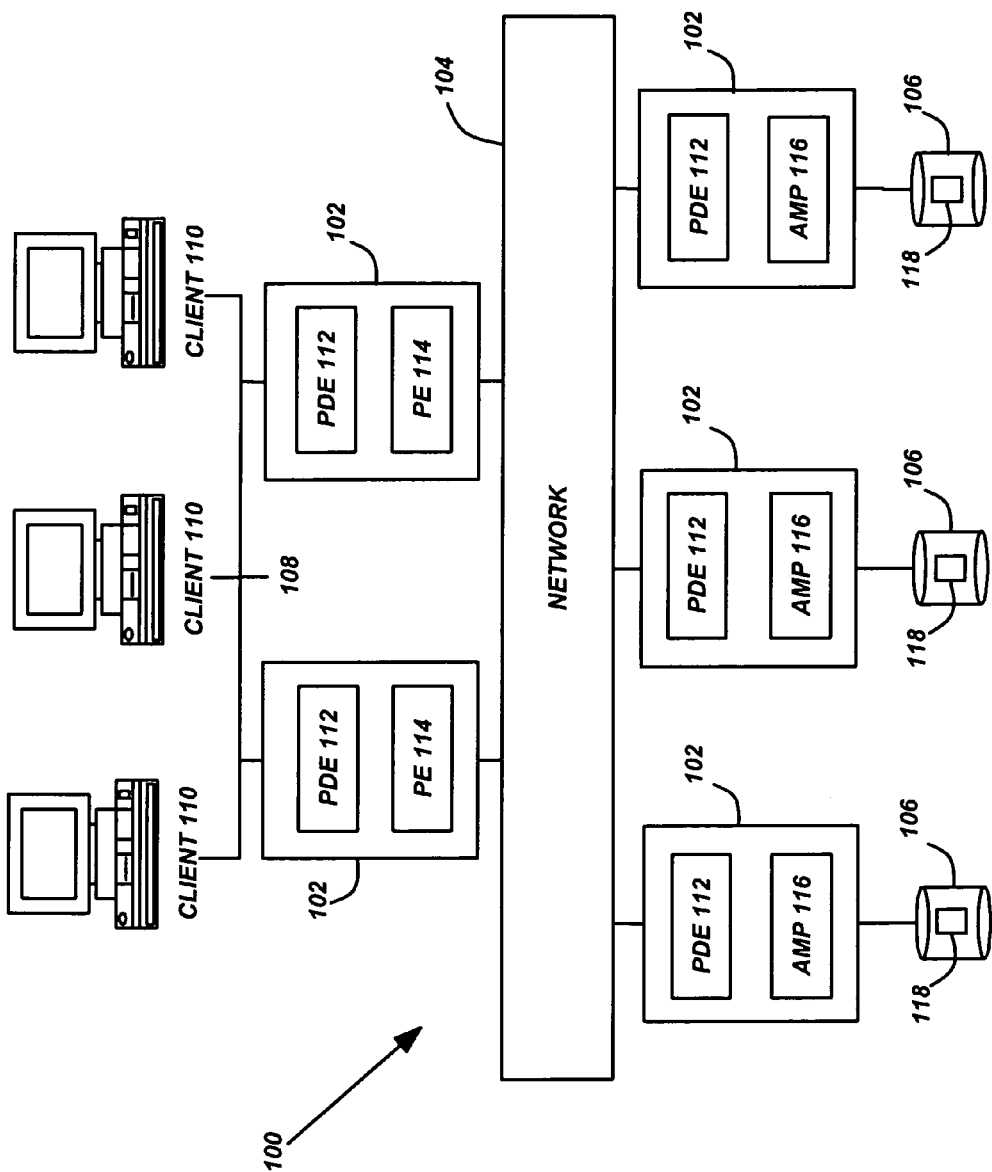
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a client 110, such as a terminal, workstation, computer, or other input device to interact with the computer system 100. This interaction generally comprises statements that conform to the Structured Query Language (SQL) standard, and extensions thereto, and invoke functions performed by a Relational DataBase Management System (RDBMS) executed by the system 100.

In the preferred embodiment of the present invention, the RDBMS comprises the Teradata® product offered by NCR Corporation, the assignee of the present invention, and includes one or more Parallel Database Extensions (PDEs) 112, Parsing Engines (PEs) 114, and Access Module Processors (AMPs) 116. These components of the RDBMS perform the functions necessary to implement the RDBMS and SQL functions, i.e., definition, compilation, interpretation, optimization, database access control, database retrieval, and database update.

Generally, the PDEs 112, PEs 114, and AMPs 116 comprise instructions and/or data that are tangibly embodied in and/or accessible from a device or media, such as RAM, ROM, one or more of the DSUs 106, and/or a remote system or device communicating with the computer system 100 via one or more of the DCUs 108. The PDEs 112, PEs 114, and AMPs 116 each comprise instructions and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

In the preferred embodiment, work is divided among the PUs 102 in the system 100 by spreading the storage of a partitioned relational database 118 managed by the RDBMS across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PDEs 112 provides a high speed, low latency, message-passing layer for use in communicating between the PEs 114 and AMPs 116. Further, the PDE 112 is an application programming interface (API) that allows the RDBMS to operate under different operating systems, in that the PDE 112 isolates most of the operating system dependent functions from the RDBMS, and performs many operations such as shared memory management, message passing, and process or thread creation.

The PEs 114 handle communications, session control, optimization and query plan generation and control, while the AMPs 116 handle actual database 118 table manipulation. Preferably, the PEs 114 fully parallelize all functions among the AMPs 116.

The system 100 does face the issue of how to improve workload performance through the addition and removal of indexes. Tools are necessary for resolving these issues. Specifically, tools are necessary for assisting in the physical database design processes for indexes, specifically on removing marginal indexes. Such a tool is described in more detail below.

Operation of the Index Wizard

Figure 2:
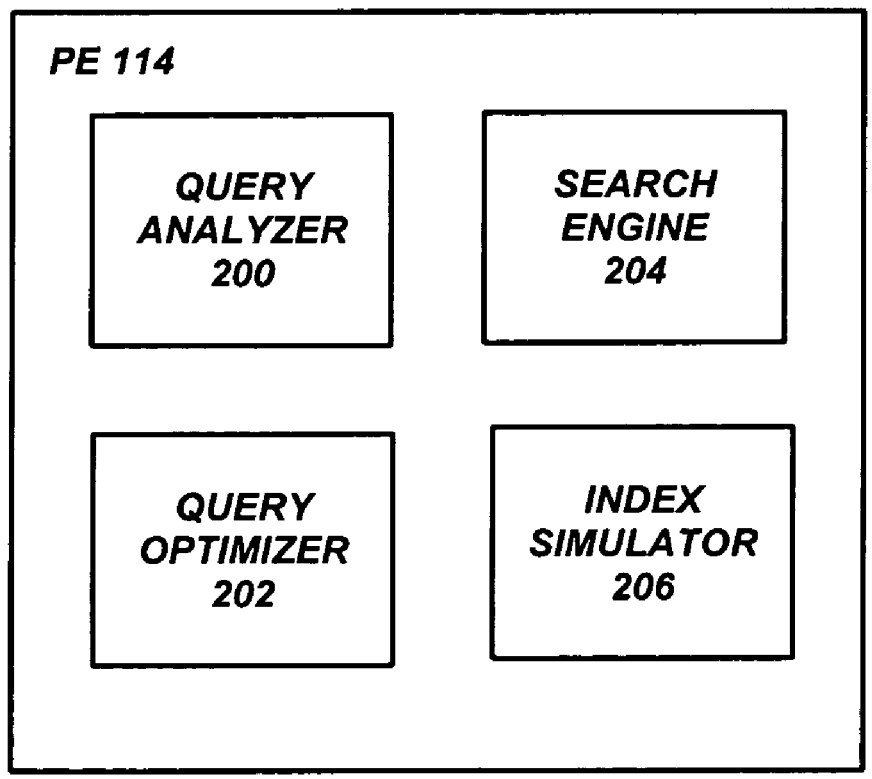
FIG. 2 is a block diagram that illustrates the components used with the preferred embodiment of the present invention.

FIG. 2 is a block diagram that illustrates the components used with the preferred embodiment of the present invention. Specifically, the present invention comprises an Index Wizard tool that assists users in tuning their physical database design by analyzing a given workload, and then recommending (1) the addition of new indexes and/or (2) the removal of existing indexes.

The Index Wizard tool includes a user interface performed by the Client 110 and various back-end components of the PE 114 that contain the intelligence for evaluating index candidates. These components of the PE 114 include a Query Analyzer 200, Query Optimizer 202, Search Engine 204 and Index Simulator 206, which perform the following functions:

The Query Analyzer 200 invokes a Predicate Analysis function of the Query Optimizer 202 to form a list of interesting or "indexable" columns, and then records the definitions of existing indexes on the tables referenced in the query along with their estimated disk space.

The Query Optimizer 202 performs a standard optimizer function whose estimated plan costs are used to evaluate alternative index recommendations.

The Search Engine 204 performs a combinatorial search algorithm capable of performing a random search on a large solution space of candidate indexes formed from the list of indexable columns generated by the Query Analyzer 200. The Search Engine 204 is also capable of performing a search on the solution space consisting of sets of existing indexes that could potentially be dropped.

The Index Simulator 206 is capable of simulating the existence (i.e., addition) of one or more new candidate indexes during query optimization. The Index Simulator 206 is also capable of simulating the non-existence (i.e., removal) of one or more existing indexes.

With regard to the addition of new indexes, the Index Wizard tool performs logic referred to as "Index Analysis," which is invoked using the following SQL statement:

INITIATE INDEX ANALYSIS ON <table_list>
FOR <workload> IN <query_capture_database>
[SET <Option>=number { [, <Option>=number ]} . . . ]

where <workload> is the name previously associated with one or more queries. The result of this SQL statement is a set of recommended index definitions defined on the tables specified in <table_list>. The recommendations are stored within a named set of pre-defined dictionary tables that is identified by <query_capture_database>. One of the primary options supported in the SET clause is the maximum number of new indexes to recommend per table.

With regard to the removal of existing indexes, the Index Wizard tool performs logic referred to as "Drop Index Analysis," which is invoked using the following SQL statement:

INITIATE DROP INDEX ANALYSIS ON <table_list>
FOR <workload> IN <query_capture_database>
[SET <Option>=number { [, <Option>=number] } . . . ]
<Option>::=NUM_INDEXES_TO_DROP
|DISK_SPACE_TO_FREE Thus, the syntax used to support the Index Analysis is extended for the Drop Index Analysis to include an optional DROP clause that changes the goal of the Index Wizard tool from the creation of new indexes to the removal of marginal indexes. In addition, the SET clause includes two options to permit further control over the indexes to consider dropping: (1) users can specify the number of indexes they would like to consider dropping, or (2) users can specify the minimum amount of disk space (in bytes) that the dropped indexes should free up.

The basic approach used in Index Analysis when recommending new indexes is to let the Query Optimizer 202 choose the indexes it likes. The Query Optimizer 202 is repeatedly called with different sets of simulated candidate indexes. The Search Engine 204 is a combinatorial search engine that is used to explore the solution space consisting of various combinations of promising new index recommendations. The set of candidate indexes that results in the lowest estimated workload costs is retained as the final recommendation.

This same basic approach is used in Drop Index Analysis to recommend a set of existing marginal indexes to drop. The Query Optimizer 202 is repeatedly called with different sets of existing indexes whose definitions have been temporarily removed from consideration by the Query Optimizer 202. The set of dropped indexes that results in the lowest estimated workload cost is retained as the final recommendation. Hence, the basic approach of the present invention is to let the Query Optimizer 202 decide which indexes it can live without.

The Drop Index Analysis is performed by first calling the Query Analyzer 200 to collect the list of existing indexes on the tables to be analyzed along with the estimated disk space occupied by each of them. Note that the primary index of each table is not included in this list as it cannot be dropped.

The Search Engine 204 is then called to enumerate sets of candidate indexes to be dropped. If the NUM_INDEXES_TO_DROP option has been specified with a value of N, the Search Engine 204 enumerates only those combinations that consist of N indexes. If the DISK_SPACE_TO_FREE option has been specified with a value of D, those combinations whose total estimated space is less than D are skipped by the Search Engine 204 and are not further considered.

For each enumerated candidate set, the Search Engine 204 calls the Index Simulator 206 to simulate the non-existence (i.e., removal) of each index by removing its definition from the dictionary information accessible by the current session.

The Query Optimizer 202 is then called to estimate the cost of executing each query without the candidate indexes. The set of dropped indexes that results in the lowest estimated cost for the entire workload (least degradation) is retained as the final recommendation. Drop recommendations are stored in the specified <query_capture_database> in the form of DROP INDEX SQL text.

The recommended set of indexes to drop will result in the least possible amount of degradation to query performance. This degradation may or may not be acceptable to users and hence it must be carefully considered prior to actually dropping the recommended indexes.

Consider the following example, which assumes a table "t1" with four secondary indexes whose definition is as follows:

CREATE TABLE t1 (
  pi INTEGER,
  a1 INTEGER,
  b1 CHAR(20),
  c1 INTEGER,
  d1 CHAR(2),
  other CHAR(40))
PRIMARY INDEX (pi), INDEX (a1), INDEX (b1),
  INDEX (c1), INDEX (d1);

Also assume the following disk space usage for the four indexes:

INDEX(a1) 1.50 MB
INDEX(b1) 7.50 MB
INDEX(c1) 1.50 MB
INDEX(d1) 0.75 MB

Finally, assume that the following four queries make up the workload "w1_sample":

1 SELECT * FROM t1 WHERE a1=10;
2 SELECT * FROM t1 WHERE a1<40 AND b1=20;
3 SELECT * FROM t1 WHERE c1=30;
4 SELECT * FROM t1 WHERE d1<50;

Following is the estimated cost for each query along with the access path chosen by the Query Optimizer 202.

| Query | Cost and Access Path |
|---|---|
| #1 | 200 milli-seconds via INDEX(a1) |
| #2 | 500 milli-seconds via INDEX(b1) |
| #3 | 300 milli-seconds via INDEX(c1) |
| #4 | 650 milli-seconds via INDEX(d1) |
| | 1,650 milli-seconds total |

Next, assume that the following Drop Index Analysis statement is performed:

INITIATE DROP INDEX ANALYSIS ON t1
FOR w1_sample IN my_qcd
SET NUM_INDEXES_TO_DROP=1, DISK_SPACE_TO_FREE=1000000;

Based on the specified DISK_SPACE_TO_FREE parameter (1 MB), the Search Engine 204 immediately eliminates INDEX(d1) from consideration because it occupies less than 1 MB. Based on the specified NUM_INDEXES_TO_DROP parameter, the Search Engine 204 then enumerates all candidates consisting of a single index as shown below.

| Candidate #1 - DROP INDEX(a1) | |
|---|---|
| Query | Cost and Access Path |
| #1 | 10000 milli-seconds via full scan |
| #2 | 500 milli-seconds via INDEX(b1) |
| #3 | 300 milli-seconds via INDEX(c1) |
| #4 | 650 milli-seconds via INDEX(d1) |
| | 11,450 milli-seconds total |

| Candidate #2 - DROP INDEX(b1) | |
|---|---|
| Query | Cost and Access Path |
| #1 | 200 milli-seconds via INDEX(a1) |
| #2 | 550 milli-seconds via INDEX(a1) |
| #3 | 300 milli-seconds via INDEX(c1) |
| #4 | 650 milli-seconds via INDEX(d1) |
| | 1,700 milli-seconds total |

| Candidate #3 - DROP INDEX(c1) | |
|---|---|
| Query | Cost and Access Path |
| #1 | 200 milli-seconds via INDEX(a1) |
| #2 | 500 milli-seconds via INDEX(b1) |
| #3 | 10000 milli-seconds via full scan |
| #4 | 650 milli-seconds via INDEX(d1) |
| | 11,350 milli-seconds total |

As shown above, for each candidate, the Query Optimizer 202 is invoked to generate the resulting plan (including access paths) and cost for each query in the workload.

Dropping INDEX(a1) or INDEX(c1) results in a very expensive full table scan on queries #1 and #3 respectively. However, dropping INDEX(b1) results in only a minor performance degradation in query #2 (550 ms vs. 500 ms) due to the existence of an alternative access path using INDEX(a1). Hence, the final recommendation would be to drop the index on column "b1". Doing so would free up disk space of 7.5 MB and would only slightly increase the total cost of the workload.

Consequently, the present invention leverages an existing architecture to solve a related but separate problem from the creation of new indexes. The selection process considers a large number of candidates and performs a query optimization to evaluate and rank each candidate by its impact on estimated query costs. This approach ensures consistency with the index selection process used in query optimization and avoids duplication of the cost model used in query optimization. Rather than introducing a separate and potentially conflicting set of rules and costs, the approach taken by the present invention is to let the query optimization process decide which indexes it can live without.

Logic of the Index Wizard

Figure 3:
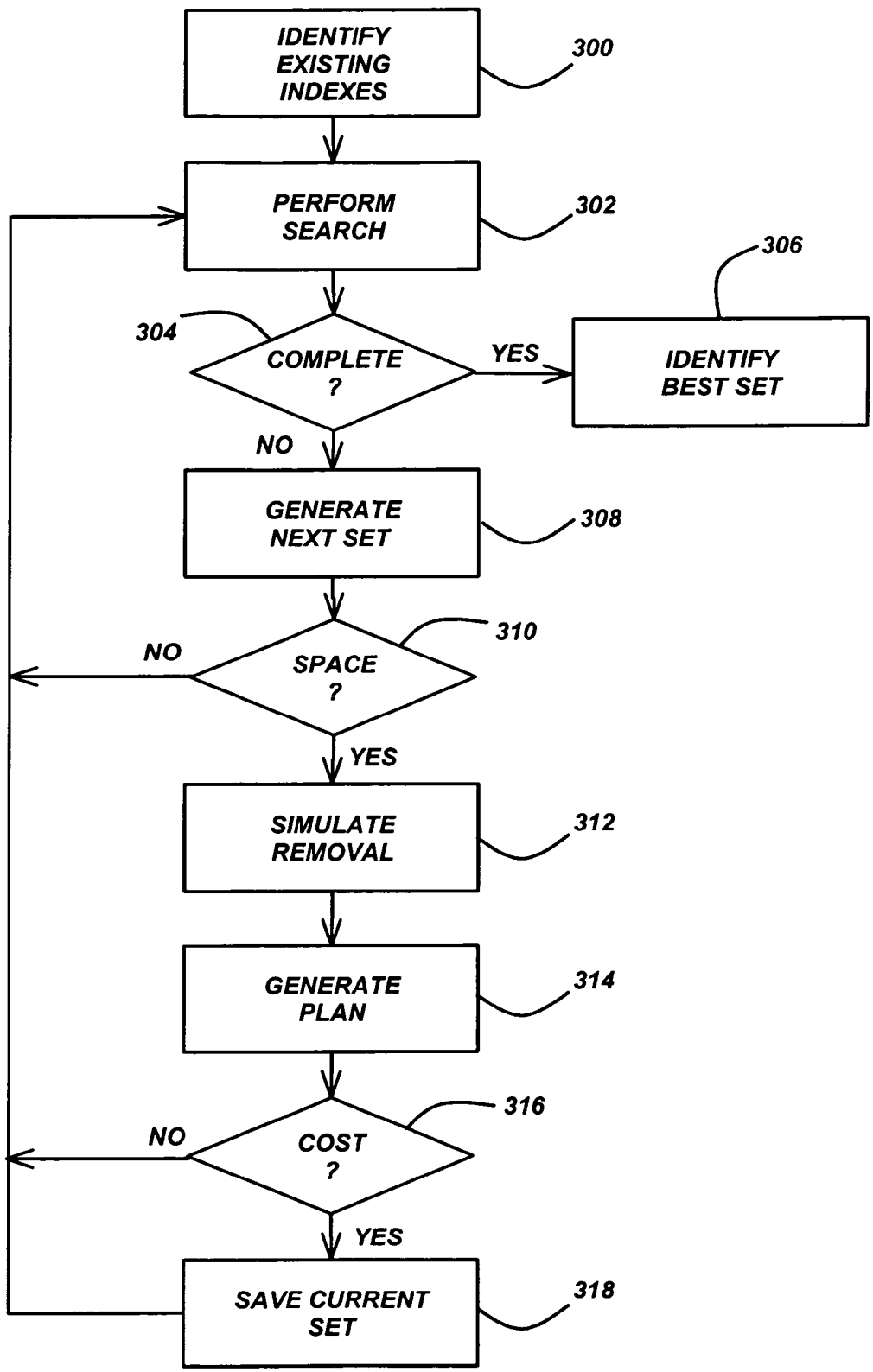
FIG. 3 is a flow chart illustrating the logic of the preferred embodiment of the present invention in managing indexes used to retrieve data from a database stored on a computer.

FIG. 3 is a flow chart illustrating the logic of the preferred embodiment of the present invention in managing indexes used to retrieve data from a database stored on a computer. Those skilled in the art will recognize that this logic is provided for illustrative purposes only and that different logic may be used to accomplish the same results.

Specifically, this logic represents the Index Wizard tool determining whether any marginal indexes exist in the database. As noted above, an index is marginal when: (1) it is an access path for one or more queries but the index's performance is matched or nearly matched by one or more other alternative access paths, and/or (2) its overhead has become a concern.

Moreover, this logic may be invoked by one or more statements or instructions that cause the computer to perform a Drop Index Analysis on a specified list of tables in the database for a specified workload. These instructions allow users to specify: (1) how many indexes to consider dropping, and/or (2) how much disk space should be freed up from the dropped indexes.

Block 300 represents the Index Wizard tool identifying existing indexes in the database that potentially could be dropped, along with an estimated disk space occupied by each of the indexes.

Block 302 represents the Index Wizard tool performing a combinatorial search in order to collect a list of the sets of indexes in the database to be analyzed. Note that a primary index for each table in the database is not included in the list.

Block 304 is a decision block that represents the Index Wizard tool determining whether the search is complete. If so, control transfers to Block 306; otherwise, control transfers to Block 308.

Block 306 represents the Index Wizard tool identifying the current best set of N candidate indexes for removal, if any. At this block, the Index Wizard tool may issue a report, or display a message and prompt the user for further processing, such as the actual removal of the current best set fN candidate indexes from the database.

Block 308 represents the Index Wizard tool generating the next set of N candidate indexes to be analyzed, i.e., enumerating only those sets of candidate indexes that contain N indexes, where N is typically a user-specified value.

Block 310 is a decision block that represents the Index Wizard tool determining whether the set of N candidate indexes represents sufficient freed disk space, in accordance with the user's specification, i.e., ensuring that the Index Wizard tool enumerates only those sets of candidate indexes that contain D disk space, where D is typically a user-specified value. If so, control transfers to Block 312; otherwise, control transfers to Block 302.

Block 312 represents the Index Wizard tool simulating removal of the set of N candidate indexes from the database, in order to determine whether any marginal indexes exist in the database.

Block 314 represents the Index Wizard tool invoking the query optimizer to generate one or more plans after the simulated removal of the set of N candidate indexes from the database. These plans estimate the cost of executing each query in a specified workload without the removed indexes. Specifically, the Index Wizard tool repeatedly performs query optimization on the specified workload using different sets of existing indexes for a specified list of tables in the database whose definitions have been temporarily removed from consideration by the query optimization.

Block 316 is a decision block that represents the Index Wizard tool determining whether the generated plans have a cost less than the cost of the current best set of N candidate indexes. If so, control transfers to Block 318; otherwise, control transfers to Block 302.

Block 318 represents the Index Wizard tool saving the set of N candidate indexes from the database as the current best set of N candidate indexes. Consequently, a set of N candidate indexes that results in a lowest estimated cost for the specified workload is retained as a recommendation for dropped indexes.

Thereafter, control transfers to Block 302 to repeat the logic.

CONCLUSION

This concludes the description of the preferred embodiment of the invention. The following describe some alternative embodiments for accomplishing the same invention. In one alternative embodiment, any type of computer, such as a mainframe, minicomputer, or personal computer, could be used to implement the present invention. In addition, any DBMS that uses indexes could benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of managing indexes used to retrieve data from a database stored on a computer, comprising:
   (a) determining, in the computer, whether any marginal indexes exist in the database; and
   (b) removing, in the computer, one or more of the marginal indexes from the database.

2. The method of claim 1, wherein an index is marginal when it is an access path for one or more queries but the index's performance is matched or nearly matched by one or more other alternative access paths.

3. The method of claim 1, wherein an index is marginal when its overhead has become a concern.

4. The method of claim 1, wherein the determining step (a) and removing step (b) are invoked by one or more statements or instructions that cause the computer to perform a Drop Index Analysis on a specified list of tables in the database for a specified workload.

5. The method of claim 4, wherein the Drop Index Analysis allows users to specify how many indexes to consider dropping.

6. The method of claim 4, wherein the Drop Index Analysis allows users to specify how much disk space that dropped indexes should free up.

7. The method of claim 1, wherein the determining step comprises:
   (1) performing a search for existing indexes in the database that could be dropped; and
   (2) simulating removal of the existing indexes from the database in order to determine whether any marginal indexes exist in the database.

8. The method of claim 7, wherein the performing step (1) and simulating step (2) comprise repeatedly performing a query optimization on a specified workload using different sets of existing indexes for a specified list of tables in the database whose definitions have been temporarily removed from consideration by the query optimization.

9. The method of claim 8, wherein a set of dropped indexes that results in a lowest estimated cost for the specified workload is retained as a recommendation.

10. The method of claim 8, wherein the query optimization decides which indexes could be dropped.

11. The method of claim 1, wherein the determining step (a) comprises:
   (1) collecting a list of existing indexes in the database to be analyzed along with an estimated disk space occupied by each of the indexes;
   (2) enumerating one or more sets of candidate indexes to be dropped from the list of existing indexes;
   (3) for each enumerated set of candidate indexes to be dropped, simulating removal of each index from the database; and
   (4) estimating a cost of executing each query in a specified workload without the removed indexes;
   (5) wherein the enumerated set of candidate indexes that results in a lowest estimated cost for the specified workload is retained as a recommendation.

12. The method of claim 11, wherein a primary index for each table in the database is not included in the list of existing indexes to be analyzed.

13. The method of claim 11, wherein the enumerating step (2) comprises enumerating only those sets of candidate indexes that contain a specified number of indexes.

14. The method of claim 11, wherein the enumerating step (2) comprises enumerating only those sets of candidate indexes that contain a specified amount of disk space.

15. A system for managing indexes used to retrieve data from a database stored on a computer, comprising:
   (a) means, performed by the computer, for determining whether any marginal indexes exist in the database, and
   (b) means, performed by the computer, for removing one or more of the marginal indexes from the database.

16. The system of claim 15, wherein an index is marginal when it is an access path for one or more queries but the index's performance is matched or nearly matched by one or more other alternative access paths.

17. The system of claim 15, wherein an index is marginal when its overhead has become a concern.

18. The system of claim 15, wherein the means for determining (a) and means for removing (b) are invoked by one or more statements or instructions that cause the computer to perform a Drop Index Analysis on a specified list of tables in the database for a specified workload.

19. The system of claim 18, wherein the Drop Index Analysis allows users to specify how many indexes to consider dropping.

20. The system of claim 18, wherein the Drop Index Analysis allows users to specify how much disk space that dropped indexes should free up.

21. The system of claim 15, wherein the means for determining (a) comprises:
   (1) means for performing a search for existing indexes in the database that could be dropped; and
   (2) means for simulating removal of the existing indexes from the database in order to determine whether any marginal indexes exist in the database.

22. The system of claim 21, wherein the means for performing (1) and means for simulating (2) comprise means for repeatedly performing a query optimization on a specified workload using different sets of existing indexes for a specified list of tables in the database whose definitions have been temporarily removed from consideration by the query optimization.

23. The system of claim 22, wherein a set of dropped indexes that results in a lowest estimated cost for the specified workload is retained as a recommendation.

24. The system of claim 22, wherein the query optimization decides which indexes could be dropped.

25. The system of claim 15, wherein the means for determining (a) comprises:
   (1) means for collecting a list of existing indexes in the database to be analyzed along with an estimated disk space occupied by each of the indexes;
   (2) means for enumerating one or more sets of candidate indexes to be dropped from the list of existing indexes;
   (3) for each enumerated set of candidate indexes to be dropped, means for simulating removal of each index from the database; and
   (4) means for estimating a cost of executing each query in a specified workload without the removed indexes;
   (5) wherein the enumerated set of candidate indexes that results in a lowest estimated cost for the specified workload is retained as a recommendation.

26. The system of claim 25, wherein a primary index for each table in the database is not included in the list of existing indexes to be analyzed.

27. The system of claim 25, wherein the means for enumerating (2) comprises means for enumerating only those sets of candidate indexes that contain a specified number of indexes.

28. The system of claim 25, wherein the means for enumerating (2) comprises means for enumerating only those sets of candidate indexes that contain a specified amount of disk space.

* * * * *